Dec. 24, 1935.	C. PARZER	2,025,305
FURRIER'S KNIFE
Filed July 2, 1935
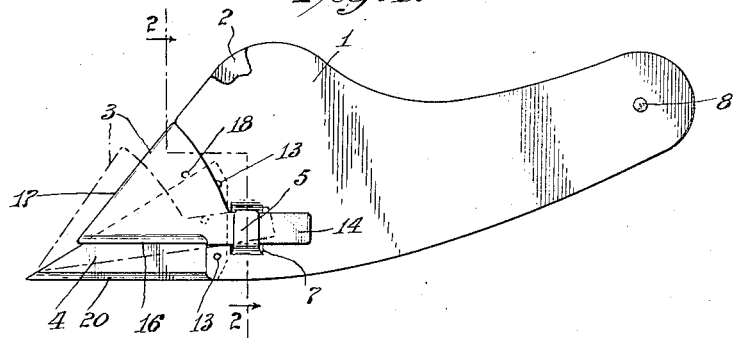 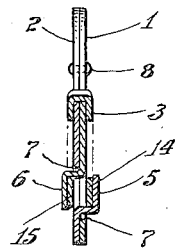
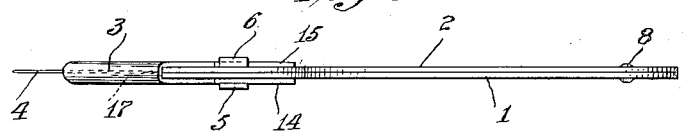
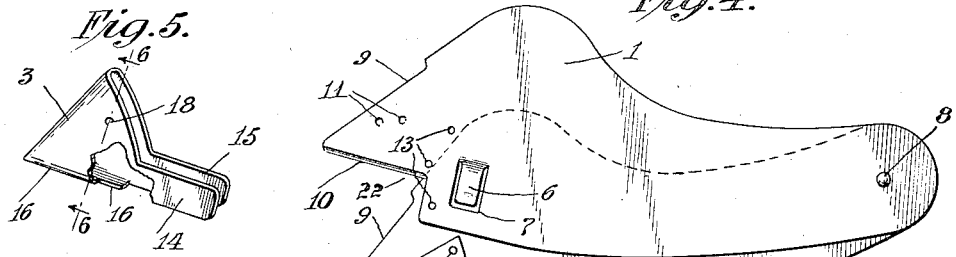
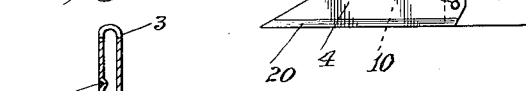
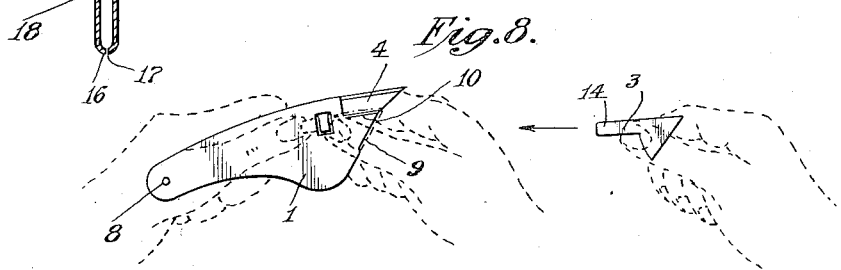
Charles Parzer
INVENTOR
BY John J. Rogan
ATTORNEY

Patented Dec. 24, 1935

2,025,305

UNITED STATES PATENT OFFICE 2,025,305

FURRIER'S KNIFE

Charles Parzer, New York, N. Y.

Application July 2, 1935, Serial No. 29,467

12 Claims. (Cl. 30—9)

This invention relates to cutting implements and more particularly to an improved form of knife.

The object of the invention is to provide an improved form of knife especially designed for use in the fur cutting art.

Another object of the invention is to provide a furrier's knife with a replacable blade, together with means for adjusting the exposed area of the cutting face.

Another object is to provide an improved manner of locking a removable cutting blade in a blade holder.

A feature of the invention relates to a handle for a cutting blade whereby the blade is securely locked in position between a pair of pivoted jaws, and having means to lock the jaws so tightly as to prevent hair or other material entering between the blade and handle.

A further feature relates to an improved furrier's knife which is designed so that continued use of the knife in cutting, does not cause the blade to become loose in its fastening handle.

A further feature relates to an improved form of lock for a removable-blade furrier's knife whereby the cutting blade may be inserted and removed expeditiously.

A still further feature relates to the novel organization, arrangement and relative location of parts which go to make up a safe, reliable and easily adjustable furrier's knife.

Other features and advantages not specifically enumerated will become apparent after a consideration of the following descriptions and the following claims.

In the drawing, which is for explanatory purposes and not necessarily by way of limitation to the specific form shown, Fig. 1 is a side elevational view of the knife in its closed position.

Fig. 2 is a front end view of Fig. 1, partly in section.

Fig. 3 is a top plan view of the knife of Fig. 1.

Fig. 4 is a view showing the knife in its open position to show clearly the manner of holding the cutting blade.

Fig. 5 is a side elevational view of the knife locking-clamp.

Fig. 6 is a top plan view of the clamp of Fig. 5 taken along the line 6—6 thereof.

Fig. 7 is a side elevational view of one preferred form of cutting blade.

Fig. 8 is a diagram showing the manner of holding the parts of the knife in inserting and removing the cutting blade.

Referring to the drawing, the knife comprises in general a handle formed of a pair of flat metal jaws 1, 2 preferably, although not necessarily, of the shape shown, the right hand elongated portions forming a grasping portion and left hand end forming the blade receiving portion. Jaws 1 and 2 may be of any suitable metal but are preferably of stainless sheet steel and are hinged or pivoted together at their right hand ends as by means of a suitable eyelet or rivet 8. The lower left hand edge of each jaw is cut out as indicated by the numeral 22 to allow the cutting edge of the blade 4 to be exposed. Blade 4 may be of any well known structure but preferably it is substantially triangular in shape and may consist for example of a portion of any well known form of flat-type safety razor blade.

Jaw 1 is provided with opening or window 7 and a struck out lug or hook 6, and in a similar manner jaw 2 is provided with an opening 7 and a struck out hook 5. It will be noted however, that the hook 5 on jaw 2 faces upwardly, while the hook 6 on jaw 1 faces downwardly, the openings 7 being sufficiently large to allow the hook on one jaw to pass through the opening in the other jaw when the said jaws are in closed position as shown clearly in Fig. 2. For the purpose of locking the jaws in their closed position there is provided a locking clamp 3 formed of a strip of stainless sheet steel bent back upon itself to the shape shown in Fig. 5 and being provided with two adjacent fingers 14, 15. The lower edge of the clamp is bevelled as indicated by the numeral 16 and defines a slit 17 to receive the knife edge. Preferably the clamp is designed so that the slant of the bent over edge is substantially the same as the slant of the corresponding edges of the jaws 1, 2 as shown in Figs. 1, 4, 5 and 8. If desired the opposed faces of the clamp 3 may be provided with inwardly extending embossed points 18 adapted to register with corresponding embossed recesses 11 in the jaw faces, these recesses corresponding to different positions in which the clamp 3 is to be held. In order to interlock the clamp with the jaws the latter preferably have their left hand edges notched as indicated by the numeral 9 to engage the edge of the clamp as shown clearly in Fig. 1, and the fingers 14, 15 are arranged to pass respectively between one of the hooks 5 or 6 and the jaw face. Thus when the locking clamp is assembled in this interlocked relation with the jaws, the finger 14 is wedged between the hook 5 and the face of jaw 1, while the finger 15 is wedged between the hook 6 and the face of jaw 2. Thus insertion of the clamp fingers in the manner indicated diagrammatically in Fig. 8 pulls the jaws together and causes them to be held in extremely close contact with the cutting blade 4. I have found that with this method of locking the jaws together, there is so little clearance between the blade and the jaw as to prevent even the finest hairs entering and clogging the cutting edge.

Preferably the jaw 2 is provided with pins or struck-up lugs 12 which are adapted to enter corresponding perforations 19 in the cutting blade 4, and likewise the jaw 1 is preferably provided with perforations 13 to receive the pins 12 after they pass through the perforations 19, it being understood of course that by reason of the fact that blades 1 and 2 are of sheet steel, they have sufficient springiness to allow the jaws to be slightly bent out of their respective planes so that the pins 12 may enter the perforations 13.

When it is desired to vary the length of the cutting point the clamp 3 may be pulled outwardly until the member 10 registers with forward recess 11, thus allowing the clamp to be tilted for example to the position shown in dotted lines in Fig. 1. It is believed that the manner of inserting and removing the cutting blade will be obvious from the foregoing description. Suffice it to say that the jaws 1, 2 are first opened as shown in Fig. 4 and the blade 4 is placed so that the perforations 19 register with the pins 12, whereupon the jaws may be rotated to closed position as shown in Figs. 1 and 8. The locking clamp 3 is then assembled so that the fingers 14 15 wedge the jaws together as shown. When it is desired to remove the blade the knife is grasped in the left hand as shown in Fig. 8 and the clamp 3 is removed with the right hand. Hooks 5, 6, are then pressed together thus separating jaws 1, 2 sufficiently to allow said jaws to be rotated to open position whereupon the blade may be removed.

While one particular embodiment of the inventive features has been disclosed, it will be understood that various changes and modifications may be made therein without departing from the spirit and scope of the invention.

What I claim is:

1. In a device of the character described, a pair of jaws pivotally attached to each other, an opening in each jaw, said openings being in substantial alignment when the jaws are closed, a lug on each jaw passing through the opening in the other jaw, and a clamping member engaging said lugs to lock the jaws together.

2. In a device of the character described, a pair of jaws pivotally attached to each other each jaw having a hook passing through and beyond the other jaw when said jaws are in closed position, a member having a knife guarding portion and a pair of fingers engaging said hooks to clamp said jaws against each other.

3. In a device of the character described, a knife blade holder comprising a pair of pivoted jaws each having a hand grip portion and a knife blade retaining portion, an integral hook member on each jaw, and a blade guard having fingers arranged to telescopically engage said hooks to clamp said jaws against each other.

4. In a device of the character described, a pair of jaws pivotally united to each other for rotation in substantially parallel planes, a locking projection on each jaw and extending through the other jaw, and a knife blade guard interlocked with said projections to force said jaws against each other.

5. A furrier's knife comprising a pair of jaws pivotally attached to each other, each jaw having a projection extending through the other jaw, a knife blade guard telescopically interlocked with said projections to lock said jaws together, said guard being adjustably mounted to vary the exposed cutting area of the knife blade.

6. A furrier's knife comprising a pair of jaws pivotally united to each other for rotation in substantially parallel planes, a struck out hook on each jaw, said hooks facing in opposite directions so that the rotation of said blades to closed position causes said hooks to overlap and lock said blades against rotation, and a blade guard telescopically engaging said hooks to wedge said jaws together.

7. A furrier's knife according to claim 6 in which each jaw is provided with an opening adjacent its hook and through which the hook on the other jaw passes.

8. A furrier's knife comprising a pair of jaws pivotally united to each other for rotation in substantially parallel planes, a window in each jaw, a projection on each jaw, the projection on one jaw passing through the window of the other jaw to lock said jaws against rotation, and a blade guard having fingers arranged to be wedged between said projections and said jaws to clamp said jaws tightly against each other.

9. A furrier's knife comprising a pair of flat sheet metal jaws pivotally attached to each other for rotation in substantially parallel planes, said jaws having a pointed portion at one end to receive a V-shaped knife blade, and an elongated portion at the other end to provide a hand grip, a hook on each jaw, and a guard member having a pointed portion and elongated fingers arranged to be wedged between said hooks and said jaws, the slant of the pointed portion of the jaws having a slant substantially similar to the slant of the forward edge of the V-shaped blade.

10. A furrier's knife according to claim 9 in which the pointed edge of each knife jaw is notched to engage an edge of said guard member to prevent said member moving when the knife is subjected to cutting pressure.

11. A furrier's knife comprising a pair of flat sheet metal jaws one of said jaws being provided with knife locating pins, and the other jaw is provided with perforations to receive said pins, a struck-out hook on each jaw passing through an opening in the other jaw said hook members being adjacent to each other when said jaws are closed, said hook members facing opposite directions, and a member acting as a knife guard and having fingers disposed on the outside faces of the jaws and telescopically engaging said hooks.

12. A knife according to claim 11 in which the outside face of one jaw is provided with a plurality of recesses to locate the guard in various adjusted positions to control the exposed area of the knife blade, and said guard is provided with a projection for engaging said recesses.

CHARLES PARZER.